United States Patent
Jain et al.

(10) Patent No.: US 8,351,703 B2
(45) Date of Patent: Jan. 8, 2013

(54) SYSTEM AND METHOD FOR EXTRACTING AND ORGANIZING DATA FROM ELECTRONIC IMAGES

(75) Inventors: Vardhman Jain, Chennai (IN); Arvind Perumbala, Chennai (IN)

(73) Assignee: Perot Systems Corporation, Plano, TX (US)

(*) Notice: Subject to any disclaimer, the term of this patent is extended or adjusted under 35 U.S.C. 154(b) by 1328 days.

(21) Appl. No.: 11/957,786

(22) Filed: Dec. 17, 2007

(65) Prior Publication Data

US 2009/0110279 A1    Apr. 30, 2009

(30) Foreign Application Priority Data

Oct. 30, 2007 (IN) .............. 2268/DEL/2007
Oct. 30, 2007 (IN) .............. 2270/DEL/2007

(51) Int. Cl.
*G06K 9/46* (2006.01)
(52) U.S. Cl. .............. 382/190; 382/306; 707/602
(58) Field of Classification Search .............. 382/190, 382/306; 705/32, 30; 707/602
See application file for complete search history.

(56) References Cited

U.S. PATENT DOCUMENTS

| | | | |
|---|---|---|---|
| 4,974,260 A | 11/1990 | Rudak | |
| 5,557,515 A * | 9/1996 | Abbruzzese et al. | 705/7.15 |
| 5,579,407 A | 11/1996 | Murez | |
| 6,400,845 B1 | 6/2002 | Volino | |
| 6,907,132 B1 | 6/2005 | Salomon | |
| 7,184,162 B2 | 2/2007 | Lech et al. | |
| 7,333,568 B2 | 2/2008 | Chen et al. | |
| 7,500,053 B1 * | 3/2009 | Kavuri et al. | 711/114 |
| 7,661,065 B2 | 2/2010 | Nickolov et al. | |
| 7,685,144 B1 * | 3/2010 | Katragadda | 707/999.101 |
| 7,769,646 B2 | 8/2010 | Wyle | |
| 7,822,628 B2 * | 10/2010 | Brady et al. | 705/7.13 |
| 8,112,605 B2 * | 2/2012 | Kavuri | 711/170 |
| 2002/0143609 A1 * | 10/2002 | Magouirk et al. | 705/10 |
| 2003/0101199 A1 | 5/2003 | Briggi | |
| 2003/0210428 A1 | 11/2003 | Bevlin | |
| 2003/0223637 A1 | 12/2003 | Simske et al. | |
| 2004/0260569 A1 | 12/2004 | Bell | |
| 2005/0177476 A1 * | 8/2005 | McCandless et al. | 705/32 |
| 2005/0198563 A1 * | 9/2005 | Kristjansson | 715/507 |
| 2005/0238260 A1 | 10/2005 | Coleman | |
| 2007/0061735 A1 | 3/2007 | Hoffberg | |
| 2007/0118391 A1 | 5/2007 | Malaney et al. | |

OTHER PUBLICATIONS

U.S. Appl. No. 11/957,807, Jain.

* cited by examiner

*Primary Examiner* — Gregory M Desire
(74) *Attorney, Agent, or Firm* — Winstead PC

(57) ABSTRACT

A method of extracting and organizing data from electronic images includes processing a set of data fields representative of data to be extracted, mapping at least a subset of the set of data fields to at least one subclient, and attaching a rule from a set of rules to at least one of the mapped data fields. Each rule in the set of rules represents a transformation from a first data format to a preferred data format. The method also includes extracting data from at least one electronic image for the at least one subclient into the plurality of mapped data fields using the attached rule and storing the extracted data.

27 Claims, 13 Drawing Sheets

FIG. 12

SYSTEM AND METHOD FOR EXTRACTING AND ORGANIZING DATA FROM ELECTRONIC IMAGES

CROSS-REFERENCE TO RELATED APPLICATIONS

This patent application incorporates by reference the entire disclosure of a U.S. patent application Ser. No. 11/957,807, filed on Dec. 17, 2007.

BACKGROUND

1. Technical Field

This patent application relates generally to image processing using a repository of scanned-in documents and, more particularly, but not by way of limitation, to an organizer application for extracting data from scanned-in documents and to an image viewing application for viewing the image and data extracted from the image.

2. History of Related Art

In today's record-processing environment, clients frequently provide batches of forms to a data processing service to have required data extracted from the forms and entered into an application utilized by the client. This process typically involves an employee of the data processing service examining a form and typing the information from the form into the client application. Even when the form is scanned into an electronic image format, the data processing employee still must view the image in one application, switch to a client application, and type the data into the client application. Needless to say, this process described above can be time-consuming and introduce numerous sources of error to the data entry process. Additionally, the speed of the data entry process is almost entirely dependent on the typing speed of the employee entering the data. In light of the above, systems and methods for accurately and efficiently extracting, viewing, and utilizing data from scanned-in documents are needed.

SUMMARY OF THE INVENTION

A method of extracting and organizing data from electronic images includes processing a set of data fields representative of data to be extracted, mapping at least a subset of the set of data fields to at least one subclient, and attaching a rule from a set of rules to at least one of the mapped data fields. Each rule in the set of rules represents a transformation from a first data format to a preferred data format. The method also includes extracting data from at least one electronic image for the at least one subclient into the plurality of mapped data fields using the attached rule and storing the extracted data.

A system for extracting and organizing data from electronic images over a network includes a client computer, a data processing server, a database server, and a network interface. The client computer is operable to provide a setup interface for obtaining setup information from a user. The data processing server is operable, responsive to setup information received from the client computer, to process a set of data fields representative of data to be extracted, map at least a subset of the set of data fields to at least one subclient, and attach a rule from a set of rules to at least one of the mapped data fields. Each rule in the set of rules represents a transformation from a first data format to a preferred data format. The data processing server is also operable to extract data from at least one electronic image for the at least one subclient into the plurality of mapped data fields using the attached rule. The database server is operable to store data extracted by the data processing server. The network interface is operable to facilitate communication among the client computer, the data processing server, and the database server.

Logic for extracting and organizing data from an electronic image is encoded in a computer-readable media and operable when executed to process a set of data fields representative of data to be extracted, map at least a subset of the set of data fields to at least one subclient, and attach a rule from the set of rules to at least one of the mapped data fields. Each rule in the set of rules represents a transformation from a first data format to a preferred data format. The logic is also operable when executed to extract data from at least one electronic image for the at least one subclient into the plurality of mapped data fields using the attached rule and store the extracted data.

BRIEF DESCRIPTION OF THE DRAWINGS

A more complete understanding of the method and apparatus of the present invention may be obtained by reference to the following detailed description when taken in conjunction with the accompanying drawings wherein:

FIG. 12 illustrates an image view application and an external client application;

DETAILED DESCRIPTION

In various embodiments of the invention, standard and non-standard forms are provided to a client. The forms contain data needing to be processed and entered into an external client application. An illustrated system and method for facilitating the data storage and data entry processes using Optical Character Recognition (OCR) technology will now be described with reference to the accompanying Figures.

Figure 1:
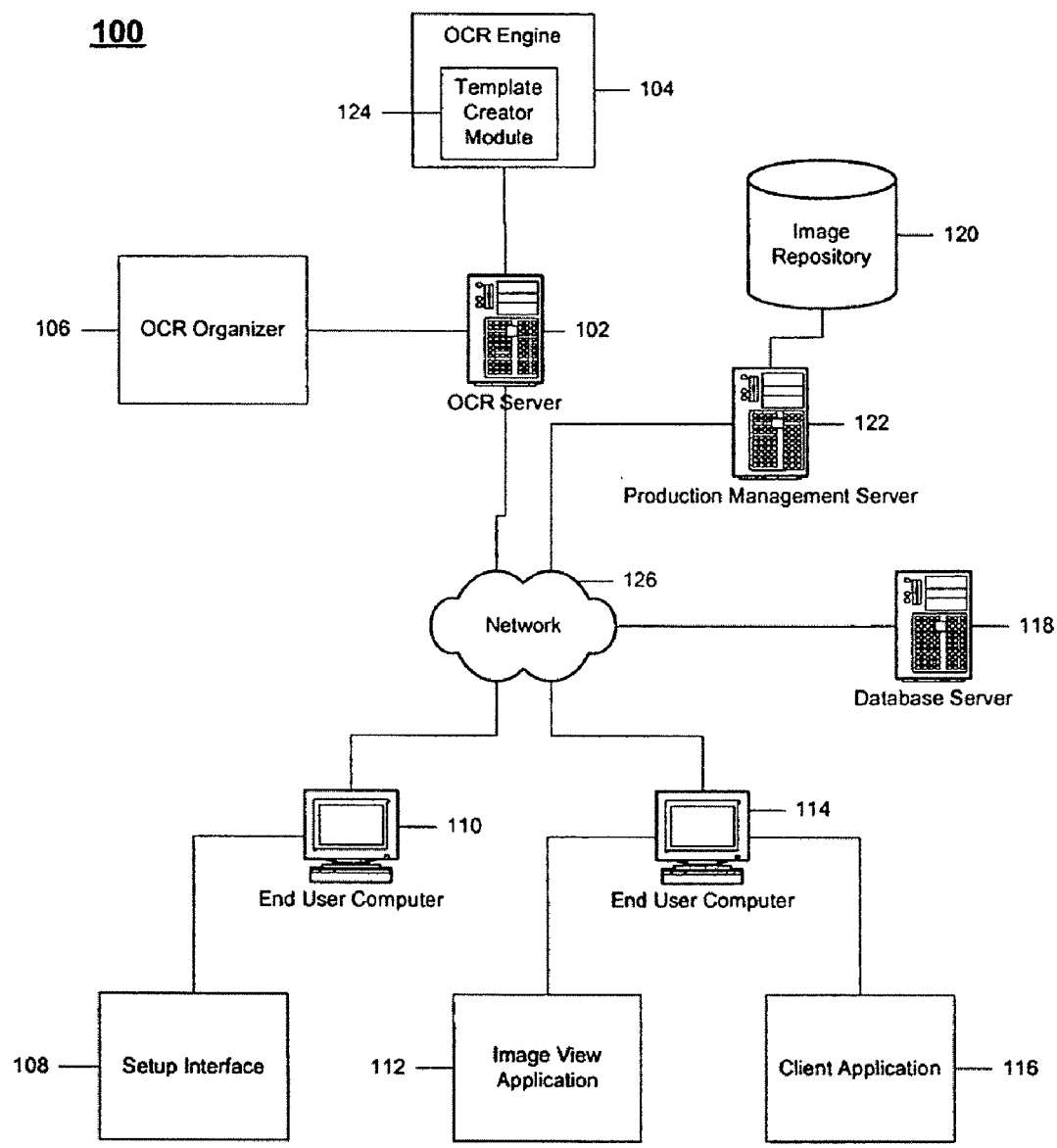
FIG. 1 illustrates an overall data extraction and utilization system.

FIG. 1 illustrates an overall system 100 for performing a data extraction process. The system 100 utilizes OCR technology in the data extraction process. The system 100 includes an OCR server 102, an image repository 120, a database server 118, an end user computer 110, an end user computer 114, and a production management server 122. An OCR engine 104 and an OCR organizer 106 are present and operating on the OCR server 102. The production management server 122 maintains an image repository 120. The end user computer 108 is configured with the ability to operate a setup interface 108 through, for example, a web browser. The end user computer 114 is configured and loaded with an image view application 112 and a client application 116. Each of the components of the OCR system 100 is connected over a network 126. In various embodiments, the network 126 may be an intranet.

Figure 2:
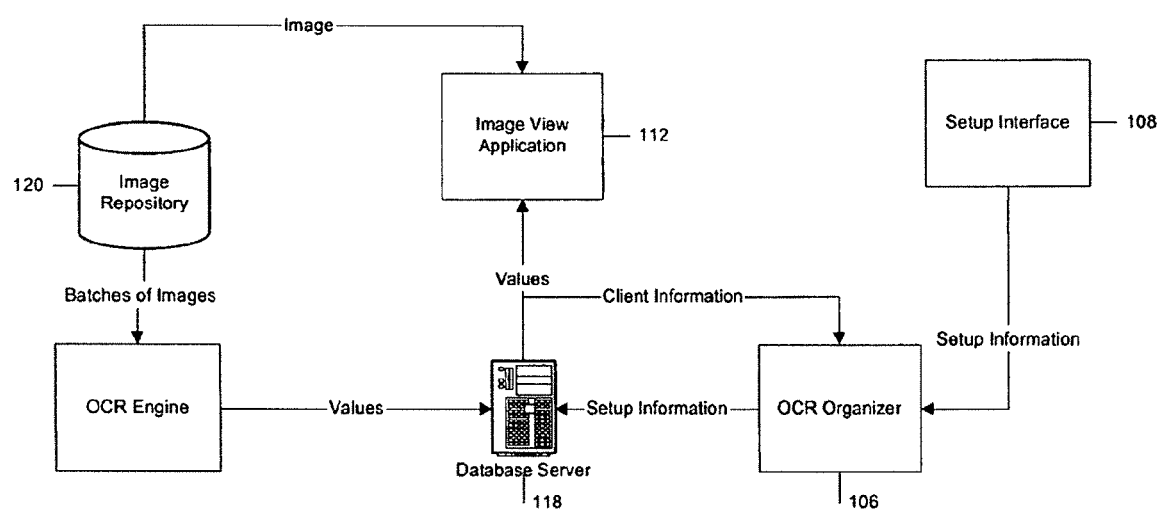
FIG. 2 illustrates an overall data flow for using the data extraction and utilization system.

FIG. 2 illustrates a flow of data through the system 100 during the data extraction process. The system 100 utilizes OCR technology in the data extraction process. The OCR system 100 may be customized and maintained by a user operating the setup interface 108. For each client requiring data entry service, one or more subclients may be created. Through the setup interface 108, the user enters setup information, thus defining the data extraction process for individual subclients. The setup information is passed to the OCR organizer 106, which stores the setup information on the database server 118. The OCR engine 104 utilizes the setup information to identify subclients for the data extraction process. Templates corresponding to forms utilized by particular subclients are created using a template creator module 124 operating within the OCR engine 104. Accordingly, identifiers are associated with each form for the subclient in order to facilitate accurate identification of the values that a completed form will contain. The identifiers also serve to distinguish the template in accordance with the form it embodies.

Once the data extraction process has been defined by subclient, batches of forms provided by a subclient are input into the image repository 120. Within the image repository 120, forms are grouped into batches by subclient, with each batch having a unique batch identification (ID) number. The image repository 120 operates as a queue, providing batches of images to the OCR engine 104 on a first-in first-out (FIFO) basis. For each individual image, the OCR engine 104 compares the image iteratively with each template for the subclient by using the identifiers associated with the previously defined templates. The identifiers distinguish each template, for example, by defined content in the form. In various embodiments, the identifiers may be independent of the location defined content in the form. When a matching template has been found, values are extracted from the form using OCR technology. The OCR engine 104 associates a confidence level with each extracted value representative of the relative confidence that the value was accurately extracted. According to the setup information for the subclient, data from the forms is mapped to corresponding fields for the subclient and stored on the database server 118. At this point, both the image of the form and the values extracted from the form may be viewed in the image view application 112.

FIGS. 3-8 are illustrative examples of the setup interface 108. In FIGS. 3-8, a user is operating the setup interface 108 on an end user computer 110. The OCR organizer 106 may be a web application and the setup interface 108 may be viewed in a web browser on the end user computer 110.

Figure 3:
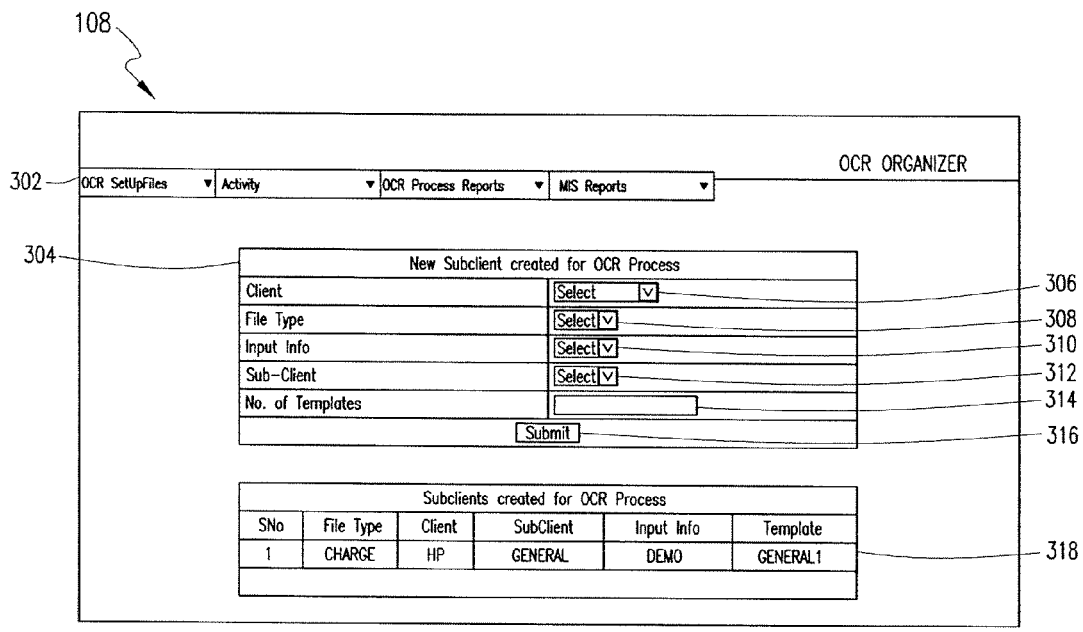
FIG. 3 illustrates a user interface for creating and reviewing subclients.

Referring first to FIG. 3, there is shown a menu bar 202, a subclient creation table 304, and a subclient listing 118. The menu bar 202 facilitates navigation throughout the setup interface 108. The subclient creation table 204 affords a user an opportunity to create subclients for a particular client by providing the requested setup information. For example, if a client is an entity owning a chain of hospitals, it may be appropriate to create subclients for each individual hospital in the chain, or even departments within hospitals. The creation of subclients enables classification of a client's forms into manageable subunits. In a client drop-down list 206, one of the set of existing clients is selected. In drop-down box 208, a file type for the subclient is selected. The file type indicates the type of information that a subclient form will obtain. In a form 314, a user may indicate the number of templates that are required for the subclient. When a submit button 316 is selected, new subclient information is stored. In a subclient listing 318, these subclients that have already been created for a particular client are listed along with each subclient's corresponding setup information.

Figure 4:
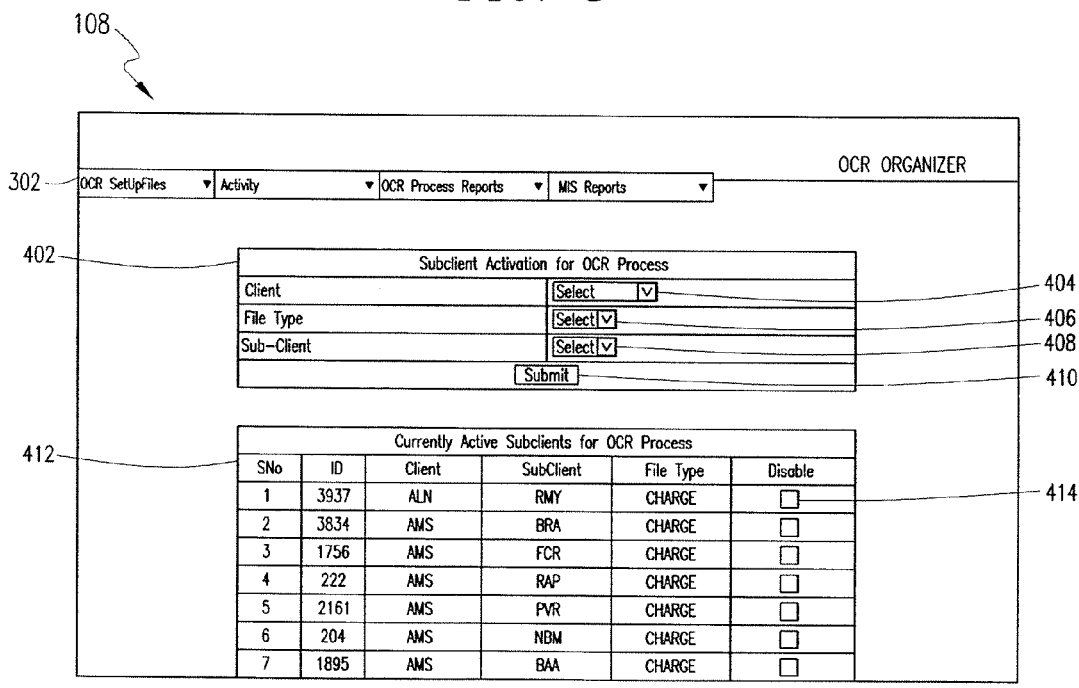
FIG. 4 illustrates a user interface for activating and disabling subclients.

Referring now to FIG. 4, there is shown a subclient activation interface 402 and an active subclient listing 412. Until a subclient has been activated, the data extraction process does not occur with respect to that subclient. A subclient may be activated by selecting the client from drop-down list 404, selecting the file type from a drop-down list 406, selecting the subclient from a drop-down list 410, and selecting a submit button 410. An active subclient listing 412 lists those subclients that have already been activated. If it is desired that the data extraction process not occur with respect to a particular subclient, the subclient may be deactivated or disabled by selecting a disable check box 414 corresponding to the subclient.

Figure 5:
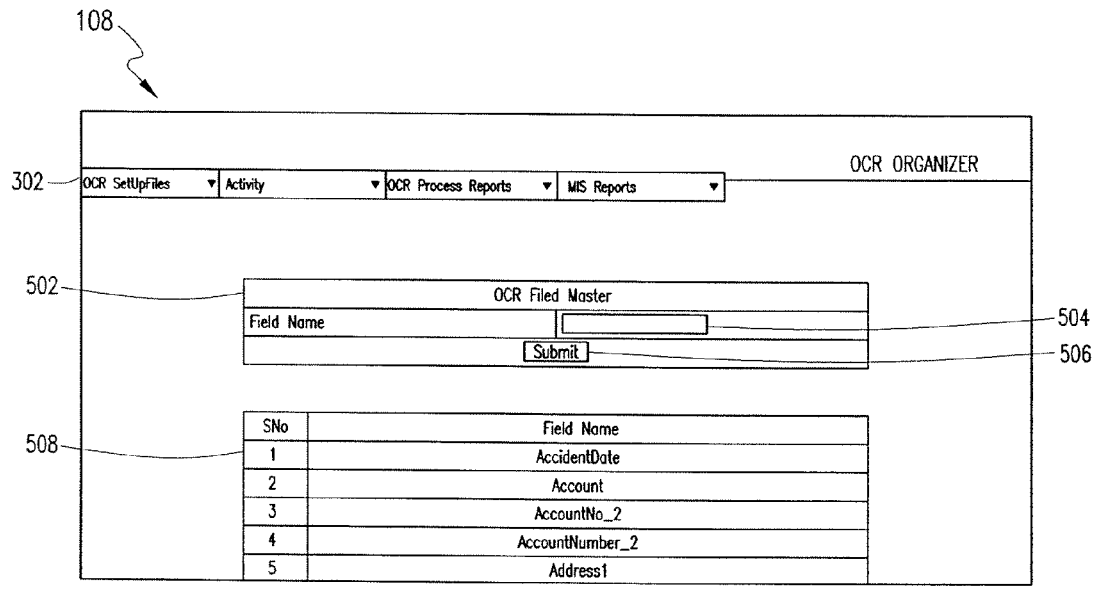
FIG. 5 illustrates a user interface for maintaining fields across subclients.

Referring now to FIG. 5, there is shown an illustrative interface for maintaining a master database of available fields across subclients. Using a field master interface 502, a user may enter the name of a particular field into form 504 and select a submit button 506 to add the field to the master database of available fields. A field listing 508 provides a listing of available fields in alphabetical order by the field name.

Figure 6:
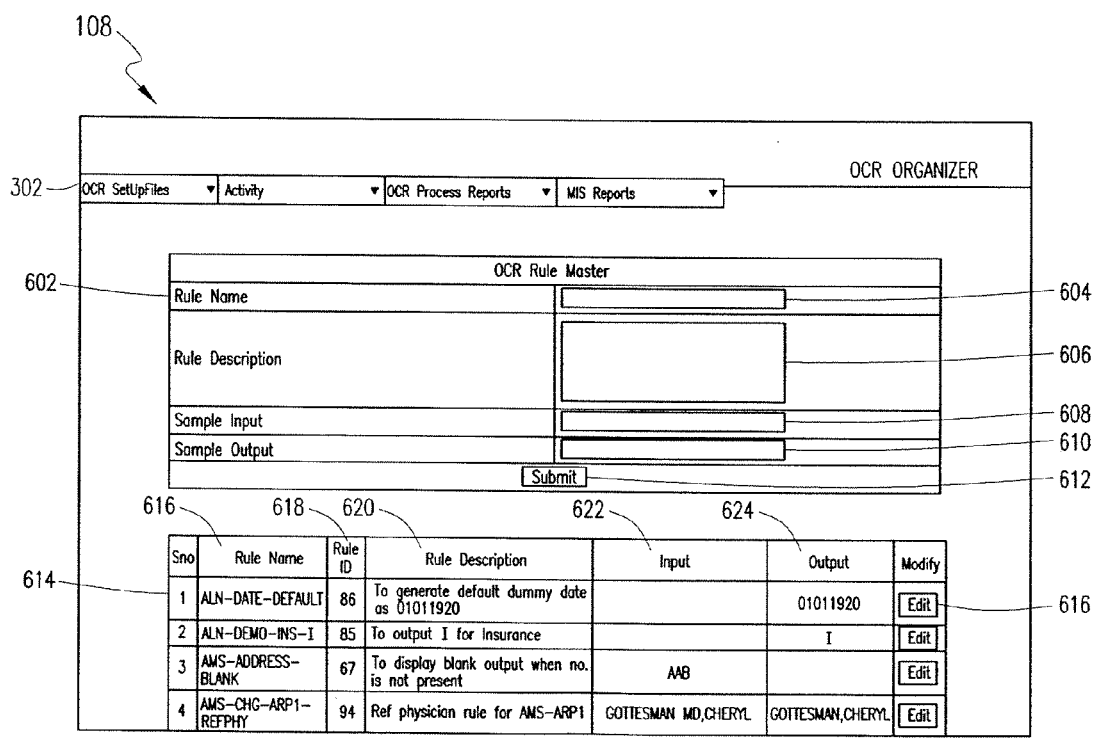
FIG. 6 illustrates a user interface for generating and reviewing rules.

Referring now to FIG. 6, there is shown an exemplary interface for creating and reviewing rules for enforcing the format of data that can be stored for all fields across subclients. Each rule is defined in a rule database on the database server 118 and is associated with at least one descriptor. In a typical embodiment, the descriptors include a rule name 616, a rule ID 618 uniquely identifying each rule in the rule database, a description 620, a sample input 622, and a sample output 624. The rules reviewed in this illustrative interface are rules that are available for all fields, regardless of subclient. Formal representations of the rules are generated in the background and are associated with the corresponding rule ID.

Using a rule master interface 602, rules may be generated by inputting data. In a form 604, the name of the rule is entered. In a form 606, a description of the rule is entered. In a form 608, a sample input is entered. In a form 610, a sample output is entered. The sample input entered into the form 608 corresponds to the expected format of specific data in a given form. The sample output entered into the form 610 corresponds to the desired format of data when given the sample input. More specifically, the format of the sample output entered into the form 610 is the format that will be utilized for storing the data in its appropriate field, should the rule be attached to the field. For instance, if it is desired that a blank entry in a form for the date be transformed to a specific default date, then the sample input entered into the form 608 would be a blank input and the sample output entered into the form 612 would be the desired default date.

The name and description of the rule serve to identify the purpose and operation of the rule. When submit button 612 is selected, the rule is added to the rule database and associated with a rule ID. A new or existing formal representation performing the function of the rule may be associated with the rule ID in the background. In a rule listing 614, rules are listed. By selecting an edit button 616 for a rule, a user is allowed to edit certain descriptors for the rule, such as the rule name 616, the rule description 620, the sample input 622, and the sample output 624.

Figure 7:
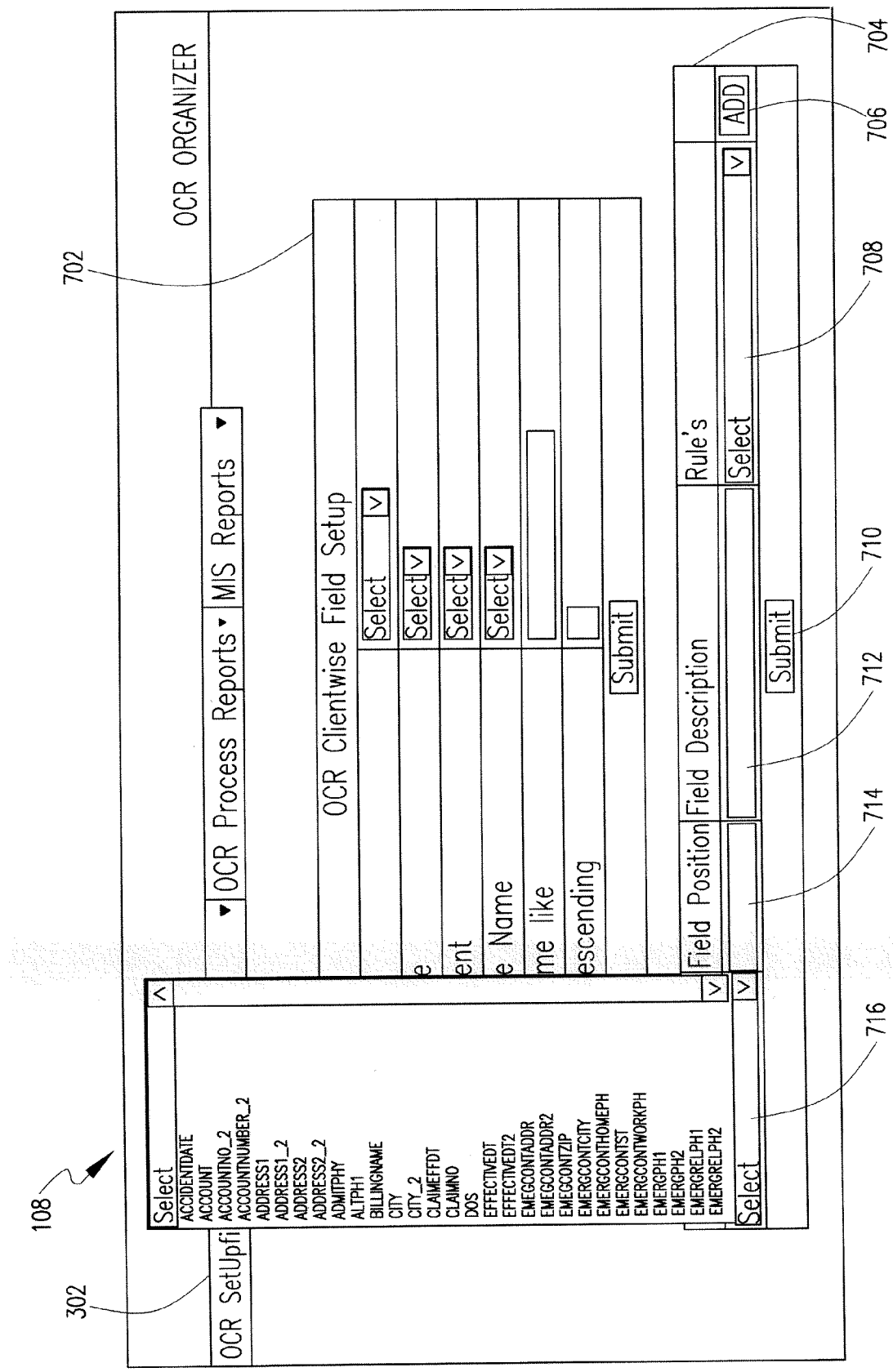
FIG. 7 illustrates a user interface for mapping fields and rules to subclients.

Referring now to FIG. 7, there is shown an exemplary interface for selecting fields and mapping rules to the fields for individual subclients. Using a subclient selection interface 702, the subclient to be used for a rule attachment process is selected. Fields are associated with a subclient and attached to a rule in a field and rule setup interface 704. In the field and rule setup interface 704, a desired field is selected from a drop-down list 716 and, if necessary, an appropriate rule is selected from a rule drop-down list 708. A field position of the field in a form is entered into a field position form 714. A description of the field is entered into a form 712. If a user is not certain which rule to attach to a particular field, the user may return to the rule master interface 602. When the add button 706 is selected, the rule is attached to the selected field. The process is repeated for each required field. When a user is satisfied with the fields and rules for a subclient, the user may select a submit button 710.

Figure 8:
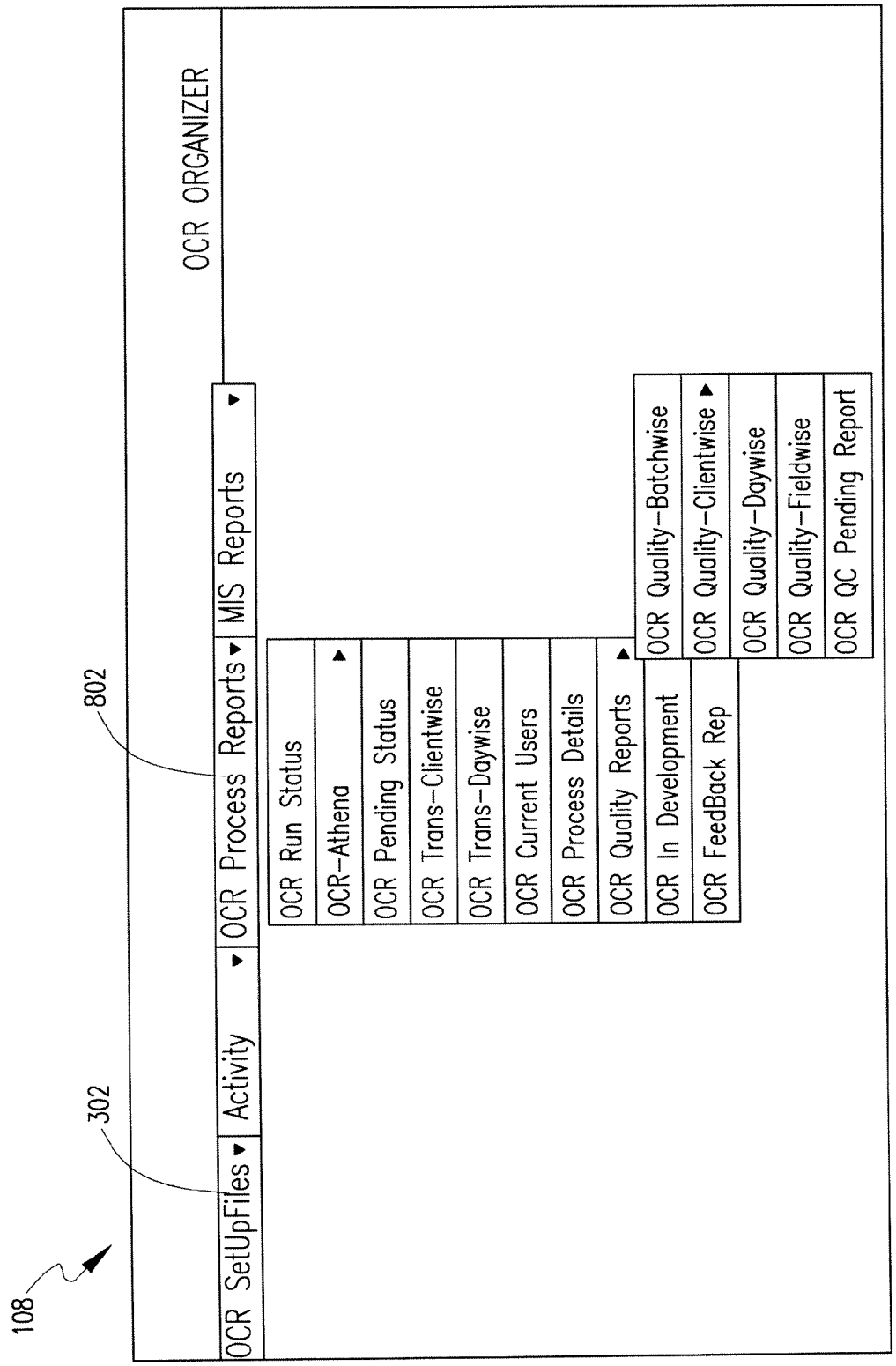
FIG. 8 illustrates a user interface for selecting reports for viewing.

Referring now to FIG. 8, there is shown an OCR Process Reports menu 802 on the menu bar 302. In a typical embodiment, reports may be generated based on feedback received or metrics generated from the data extraction process. Developers may correct or enhance the OCR process 900 or the system 100 based upon the reports. Reports may also be indicative of the general accuracy of the OCR system 100. In various embodiments, reports may be by batch, client, day, fields, or some combination thereof.

Figure 9:
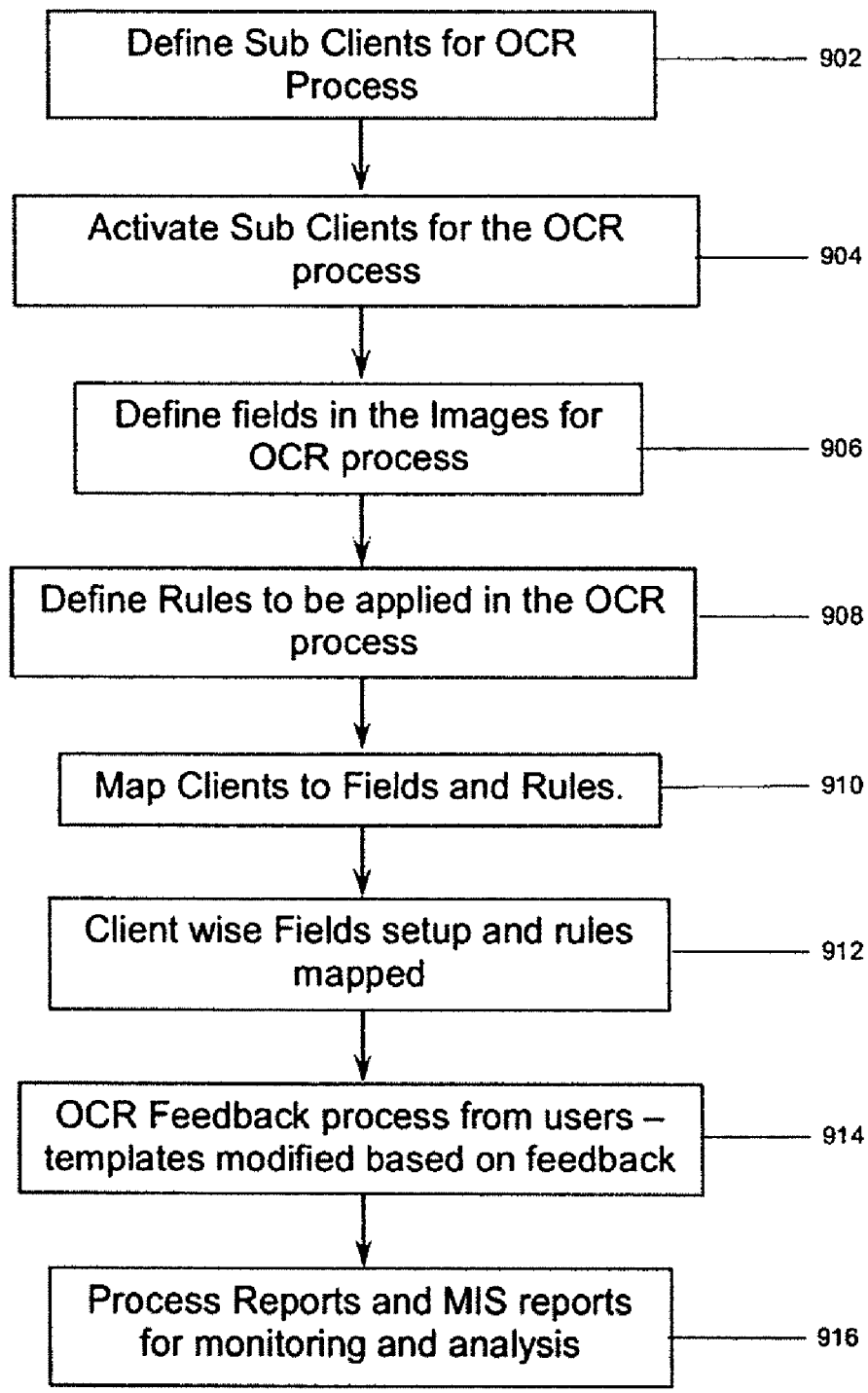
FIG. 9 illustrates an OCR organizer process.

Referring now to FIG. 9, there is shown an OCR process 900 for using the OCR organizer 106. The process begins at step 902. At step 902, subclients are defined for the OCR process 900 as described with respect to FIG. 3. At step 904, the subclients are activated in a manner similar to that described with respect to FIG. 4. At step 906, fields are defined for the images involved in the OCR process 900 as described with respect to FIG. 5. At step 908, rules are defined in a manner similar to that described with respect to FIG. 6. At step 910, clients are mapped to fields and rules as described with respect to FIG. 7. At step 910, rules are mapped to fields, also described with respect to FIG. 7. At step 914, feedback on the OCR process 900 is received from users and templates are modified based on the feedback. At step 916, reports and other analyses of the OCR system 100 are reviewed.

Figure 10:
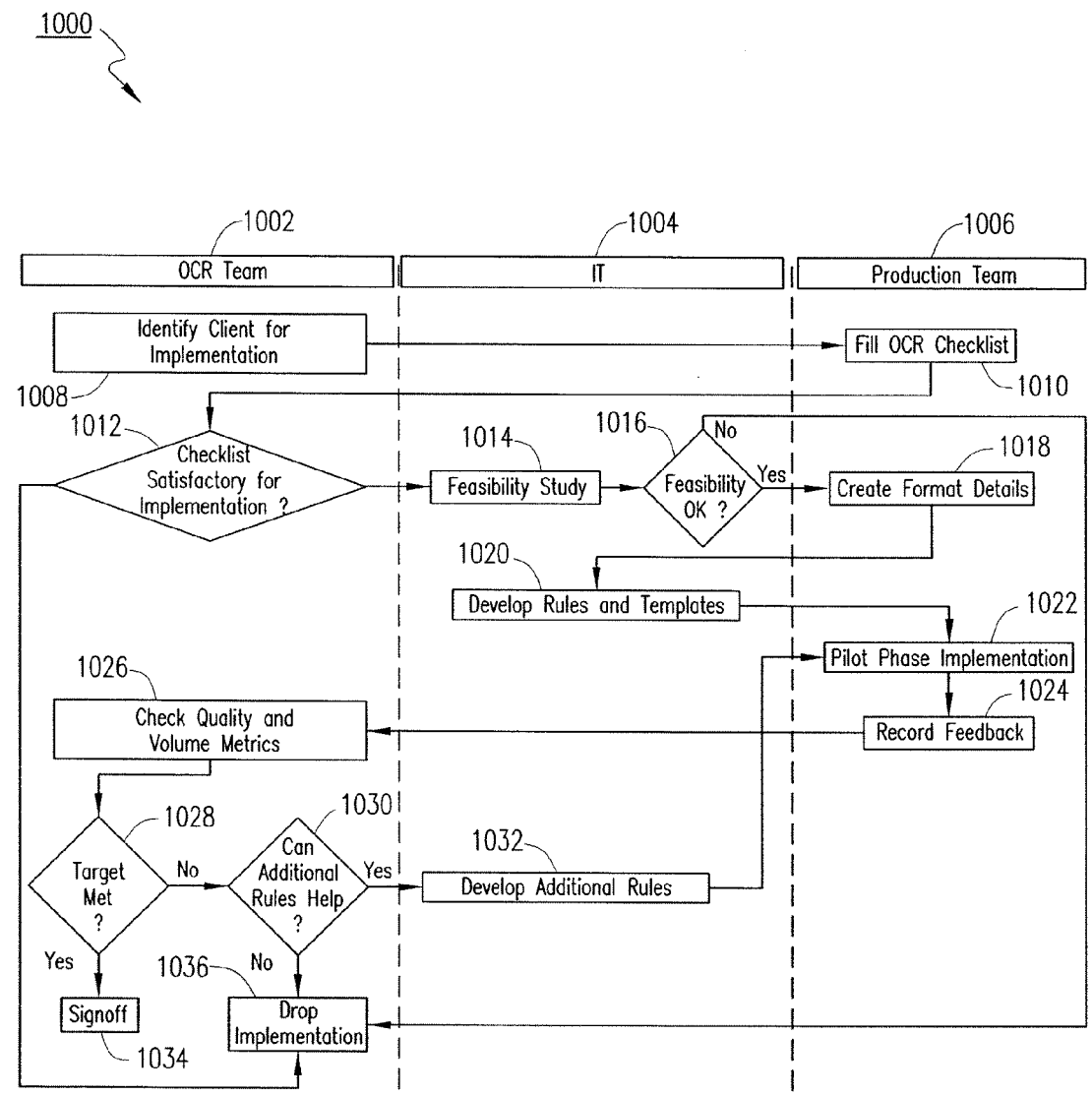
FIG. 10 illustrates an OCR organizer implementation process.

Referring now to FIG. 10, there is shown a process 1000 for implementing the OCR system 100. In the process 1000, an OCR team 1002, Industrial Technology (IT) staff 1004, and a production team 1006 interact as shown. At step 1008, the OCR team 1002 identifies a client for implementation of the OCR system 100. At step 1010, the production team 1006 fills out an OCR checklist for the identified client in order to determine a set of requirements. At step 1012, the OCR team 1002 determines whether the checklist is satisfactory for implementation. If the checklist is not determined to be satisfactory, the implementation is dropped at step 1036 and the process 1000 ends. If the OCR team 1002 determines that the checklist is satisfactory, the process 1000 moves to step 1014, where a feasibility study is performed by the IT staff 1004. If the implementation fails the feasibility study, the implementation is dropped at step 1036 and the process 1000 ends. If the implementation passes the feasibility study, format details of the client's forms and of data to be extracted from the forms are created by the production team 1006 at step 1018. At step 1020, rules and templates are developed by IT staff 1004 based on the format details.

At step 1022, the production team 1006 conducts a pilot phase implementation and records feedback for the implementation at step 1024. At step 1026, the OCR team 1002 checks the quality and volume metrics of the system. At step 1028, if a predefined target for the quality and volume metrics has been met, the OCR team 1002 approves the implementation. If the predefined target is not met, the OCR team 1002 determines whether additional rules may improve the metrics at step 1030. If the OCR team 1002 determines that additional rules would not serve to improve the metrics, the implementation is dropped at step 1036 and the process 1000 ends. If it is determined that additional rules may serve to improve the metrics, IT staff 1004 develop additional rules at step 1032 and the production team 1006 conducts another pilot phase implementation. The process 1000 ends whenever the OCR team 1002 approves the implementation or implementation is dropped.

Figure 11:
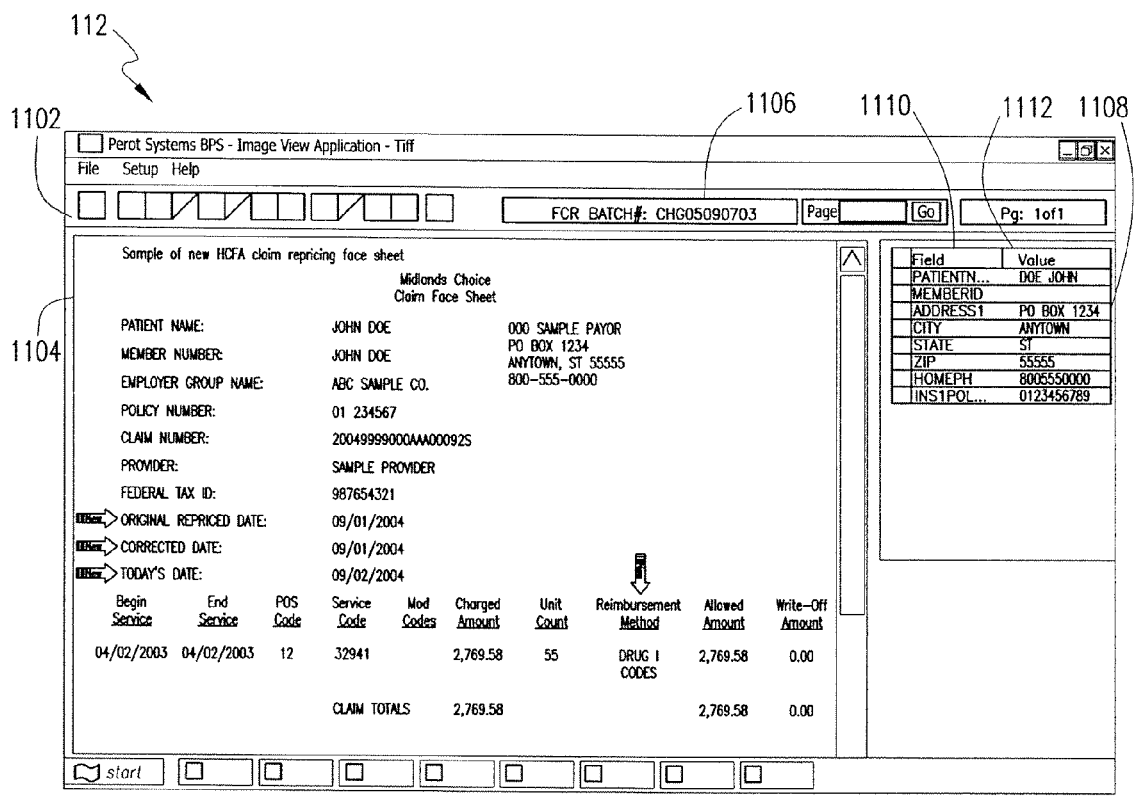
FIG. 11 illustrates an image view application.

FIGS. 11-15 illustrate an embodiment of the image view application 112. In the embodiment shown in FIGS. 11-15, the image view application 112 typically utilizes a client-server architecture and a user operates the image view application 112 on an end user computer 116. Referring first to FIG. 11, the image view application 112 is shown with a control bar 1102, an image 1104, and a field table 1108. The control bar 1102 provides a user-friendly interface for navigating through the image view application 112. A batch ID in field 1106 of the image view application 1106 identifies the batch currently being viewed. By using the buttons on the control bar 1102, a user may navigate forward or backward through the batch of images, skip to the first or last image in the batch, or zoom-in or zoom-out on the image 1104. In the left pane of the application, the image 1104 is displayed. The image 1104, for example, may be in the format of a *.tiff file or *.pdf file. In the right pane of the application, a field table 1108 shows each field 1110 and its corresponding value 1112. The fields displayed for the image 1104 correspond to the fields associated with the subclient using the setup interface 108 as shown in FIG. 7. Accordingly, the image 1104 of a form may be viewed simultaneously along with data already extracted from the image 1104.

Figure 12:
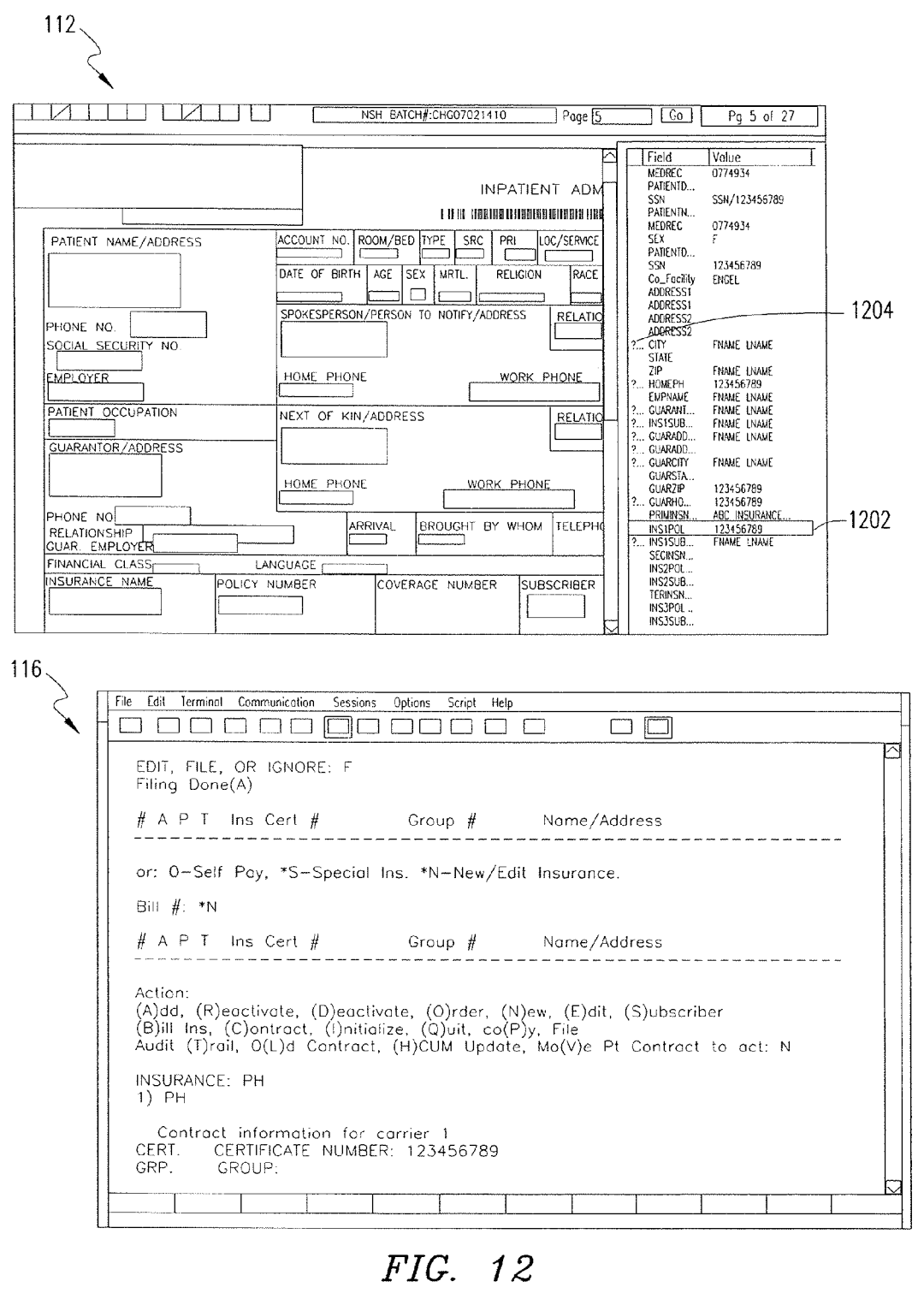
Figure 13:
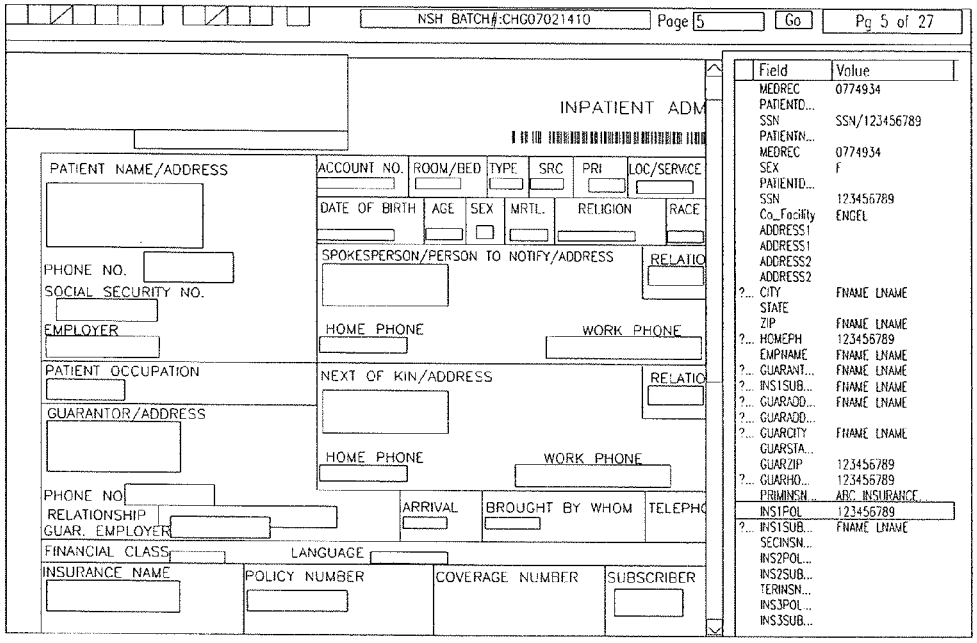
FIG. 13 illustrates an image view application and an external client application.

Referring to FIGS. 12-13, further features of an embodiment of the image view application 112 will now be described. With regard to quality compliance, each question mark 1204 indicates that the value in the corresponding field is a suspect value. A value is determined to be a suspect value when the confidence level in the accuracy of the data extraction, as determined by the OCR Engine 104 at the time of data extraction, is below a predetermined threshold. In order to alert the user of the situation, along with a question mark indication, the field 1110 and the corresponding value 1112 for each non-conforming field are typically displayed in red or another easily identifiable color. As will be described in more detail below, the user may leave feedback regarding the problem or correct the problem when performing data entry.

Still referring to FIG. 13, data entry using the image application 112 will now be described. If it is desired to enter data from the image 1104 into a client application 116, a user may select a row in the field table 1108. By selecting the row in the field table 1108, the corresponding value 1112 is automatically copied to memory without the use of a keyboard sequence such as CTRL+C. The user may then switch to the client application 116, as shown in FIG. 13, and paste the value at the preferred location in the client application 116. The value may be pasted using any one of many possible pasting procedures supported by the user's operating system environment, such as, for example, the keyboard sequence CTRL+V. If the value 1112 is incorrect when compared with the image 1104, as may be suggested by the value 1112 being indicated as a suspect value (e.g., displayed in red), the user may instead type the correct value into the client application 116.

Figure 14:
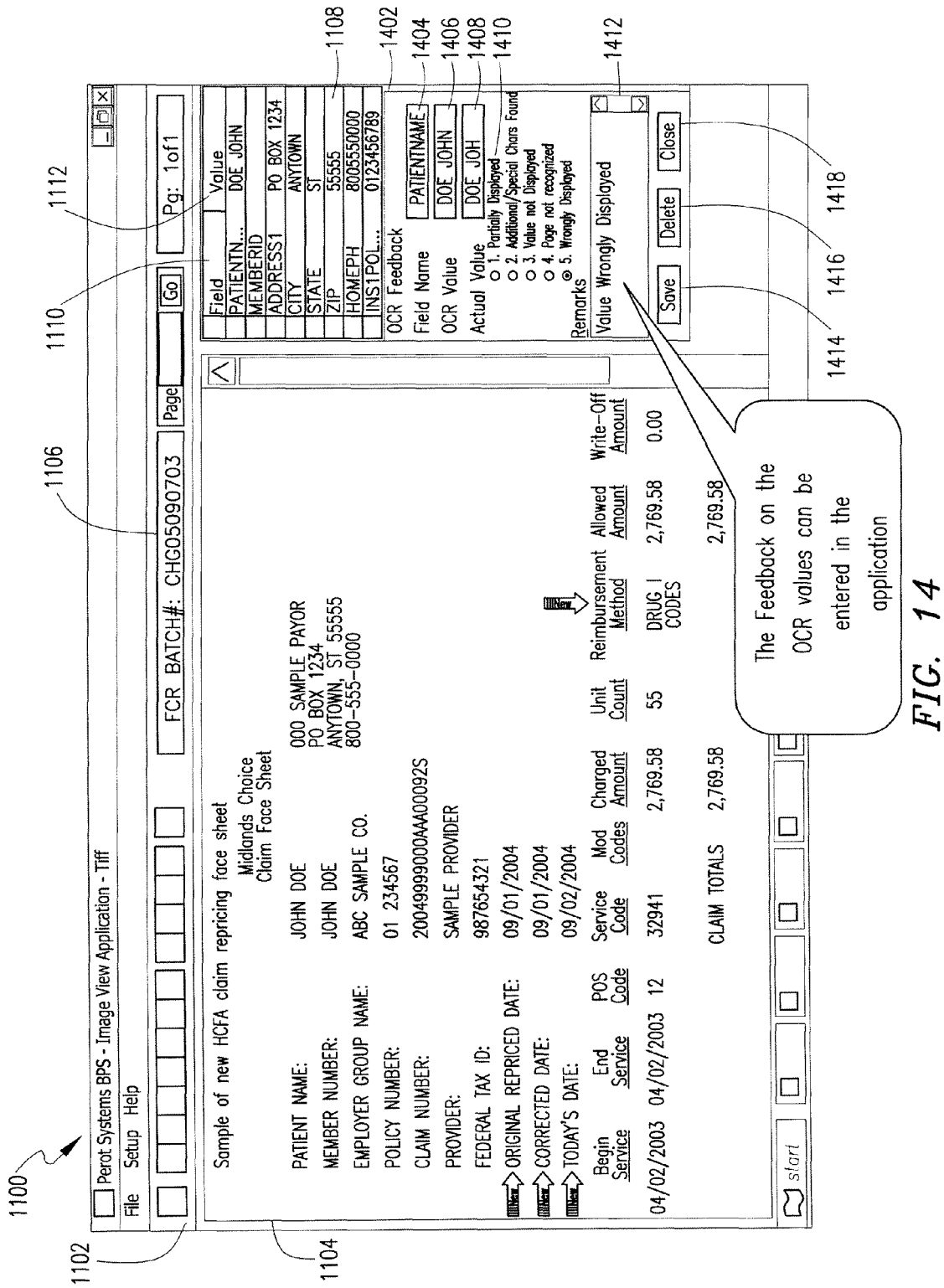
FIG. 14 illustrates an image view application with an interface for providing feedback.

Referring now to FIG. 14, an embodiment of the image view application 112 with a feedback interface 1402 is illustrated. As an added benefit of having the image 1104 and the field table 1108 viewable in the same application, a user may compare the value 1112 with content on the image 1104. If a discrepancy is noticed, particularly a repeated discrepancy, feedback may be sent directly to developers or others maintaining the system 100. If, for example, "DOE JOHN" is routinely extracted by the system 100 as a name instead of the correct "DOE JOH", the user could leave feedback for this field. In forms 1404 and 1406, the field name 1402 and the OCR value 1404 for the field 1402 are automatically entered.

In a form 1408, the user may enter the correct value for the field. Using one of the radio buttons 1410, the user selects one of five options to identify the problem with the OCR value. In the illustrated embodiment, the options include: partially displayed, additional or special characters found, value not displayed, page not recognized, and wrongly displayed. According to a selected radio button 1412, the image view application 112 automatically places a remark into a remark form 1412. The user, however, is allowed to edit the remark. The user may delete the remark by selecting a delete button 1416, close the feedback interface 1402 by selecting a close button 1418, or save the feedback via a save button 1414. If the save button 1414 is selected, the feedback is saved and developers or others maintaining the system 100 have access to the feedback. With the feedback, action may be taken to correct the identified problem.

Figure 15:
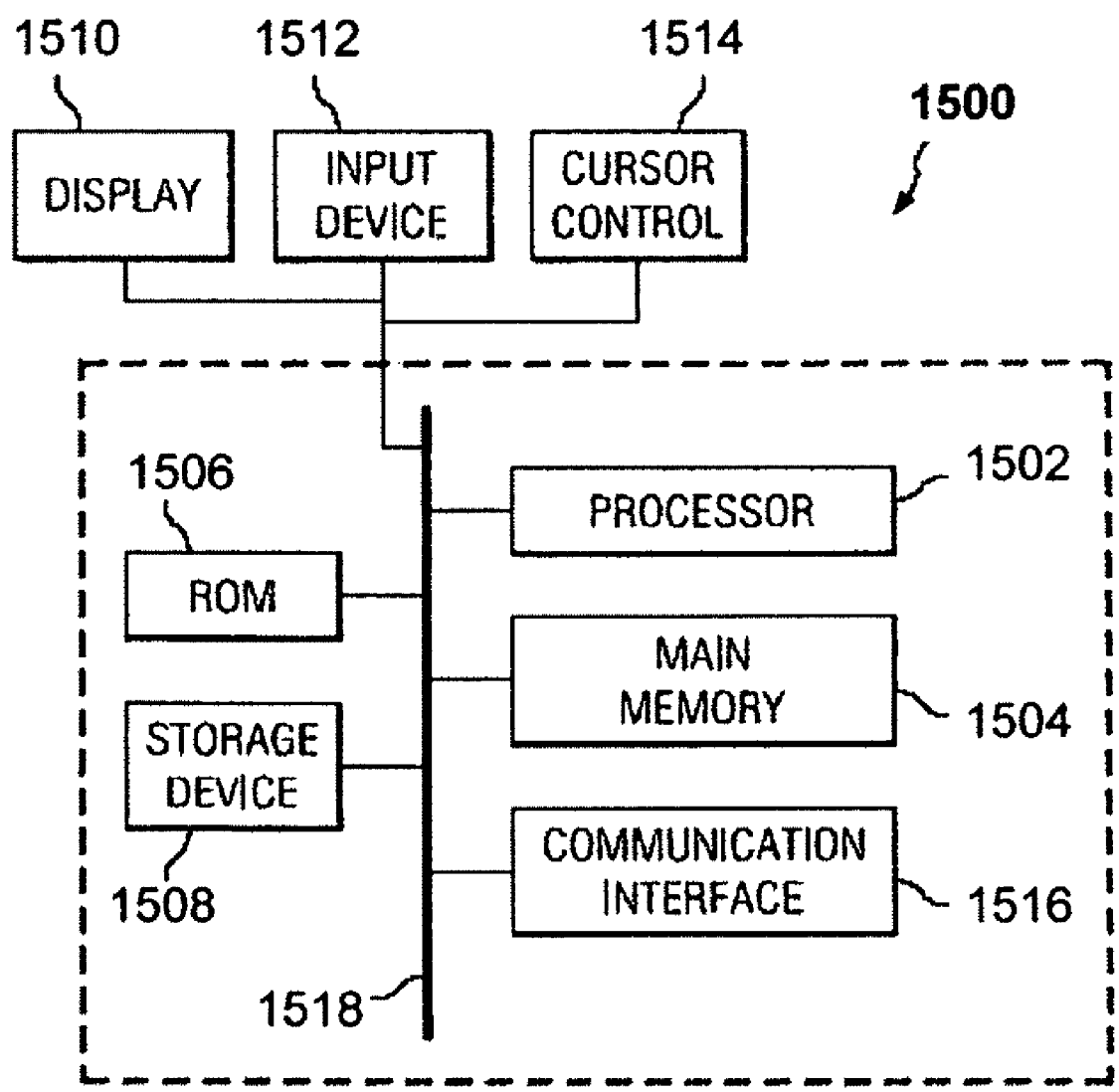
FIG. 15 illustrates an embodiment of a computer on which various embodiments of the invention may be implemented.

FIG. 15 illustrates an embodiment of a computer on which various embodiments of the invention may be implemented, including an OCR server 102, a production management server 122, a database server 118, an end user computer 110, and an end user computer 114. In the implementation, a computer 1500 may include a bus 1518 or other communication mechanism for communicating information and a processor 1502 coupled to the bus 1518 for processing information. The computer 1500 also includes a main memory 1504, such as random access memory (RAM) or other dynamic storage device, coupled to the bus 1518 for storing computer readable instructions by the processor 1502.

The main memory 1504 also may be used for storing temporary variables or other intermediate information during execution of the instructions to be executed by the processor 1502. The computer 1500 further includes a read only memory (ROM) 1506 or other static storage device coupled to the bus 1518 for storing static information and instructions for the processor 1502. A computer readable storage device 1508, such as a magnetic disk or optical disk, is coupled to the bus 1518 for storing information and instructions for the processor 1502. The computer 1500 may be coupled via the bus 1518 to a display 1510, such as a liquid crystal display (LCD) or a cathode ray tube (CRT), for displaying information to a user. An input device 1512, including, for example, alphanumeric and other keys, is coupled to the bus 1518 for communicating information and command selections to the processor 1502. Another type of user input device is a cursor control 1514, such as a mouse, a trackball, or cursor direction keys for communicating direct information and command selections to the processor 1502 and for controlling cursor movement on the display 1510. The cursor control 1514 typically has two degrees of freedom in two axes, a first axis (e.g., x) and a second axis (e.g., y), that allow the device to specify positions in a plane.

The term "computer readable instructions" as used above refers to any instructions that may be performed by the processor 1502 and/or other component of the computer 1500. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as the storage device 1508. Volatile media include dynamic memory, such as the main memory 1504. Transmission media include coaxial cables, copper wire and fiber optics, including wires of the bus 1518. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 1502 for execution. For example, the instructions may initially be borne on a magnetic disk of a remote computer. The remote computer can load the instructions into its dynamic memory and send the instructions over a telephone line using a modem. A modem local to the computer 1500 can receive the data on the telephone line and use an infrared transmitter to convert the data to an infrared signal. An infrared detector coupled to the bus 1518 can receive the data carried in the infrared signal and place the data on the bus 1518. The bus 1518 carries the data to the main memory 1504, from which the processor 1502 retrieves and executes the instructions. The instructions received by the main memory 1504 may optionally be stored on the storage device 1508 either before or after execution by the processor 1502.

The computer 1500 may also include a communication interface 1516 coupled to the bus 1518. The communication interface 1516 provides a two-way data communication coupling between the computer 1500 and a network, such as the network 126 of FIG. 1. For example, the communication interface 1516 may be an integrated services digital network (ISDN) card or a modem used to provide a data communication connection to a corresponding type of telephone line. As another example, the communication interface 1516 may be a local area network (LAN) card used to provide a data communication connection to a compatible LAN. Wireless links may also be implemented. In any such implementation, the communication interface 1516 sends and receives electrical, electromagnetic, optical, or other signals that carry digital data streams representing various types of information. The storage device 1508 can further include instructions for carrying out various processes for image processing as described herein when executed by the processor 1502. The storage device 1508 can further include a database for storing data relative to same.

Although the present invention is described with respect to embodiments using OCR technology, it will be apparent to one of ordinary skill in the art that other technologies may also be used without departing from the sprit and scope of the invention. It will also be apparent to one skilled in the art that, although various embodiments are described with respect to medical documents, the present invention is contemplated as being equally applicable to documents in other disciplines.

The invention claimed is:

1. A method of extracting and organizing data from electronic images, the method comprising:
processing, by at least one computer comprising a processor and memory, a set of data fields representative of data to be extracted;
mapping, by the at least one computer, at least a subset of the set of data fields to at least one subclient;
attaching, by the at least one computer, a rule from a set of rules to at least one of the mapped data fields, wherein each rule in the set of rules represents a transformation from a first data format to a preferred data format;
extracting, by the at least one computer, data from at least one electronic image for the at least one subclient into the plurality of mapped data fields using the attached rule; and
storing, by the at least one computer, the extracted data.

2. The method according to claim 1, further comprising producing a plurality of templates for the at least one subclient.

3. The method according to claim 2, wherein mapping at least a subset of the set of data fields to the at least one subclient comprises mapping the subset of data fields to specified data in the plurality of templates.

4. The method according to claim 2, further comprising comparing the at least one electronic image for the at least one subclient to each of the plurality of templates in order to identify a matching template for each electronic image.

5. The method according to claim 1, further comprising activating the at least one subclient for participation in data extraction.

6. The method according to claim 5, further comprising disabling the at least one subclient from participation in data extraction.

7. The method according to claim 1, further comprising generating at least one report evaluative of the data extraction.

8. The method according to claim 1, further comprising displaying one of the at least one electronic image and data extracted from the one of the at least one electronic image in a single user interface.

9. The method according to claim 1, wherein the data is extracted using optical character recognition (OCR) technology.

10. A system for extracting and organizing data from electronic images over a network, the system comprising:
a client computer operable to provide a setup interface for obtaining setup information from a user;
a data processing server operable, responsive to setup information received from the client computer, to:
process a set of data fields representative of data to be extracted;
map at least a subset of the set of data fields to at least one subclient;
attach a rule from a set of rules to at least one of the mapped data fields, wherein each rule in the set of rules represents a transformation from a first data format to a preferred data format;
extract data from at least one electronic image for the at least one subclient into the plurality of mapped data fields using the attached rule;
a database server operable to store data extracted by the data processing server; and
a network interface operable to facilitate communication among the client computer, the data processing server, and the database server.

11. The system according to claim 10, wherein the data processing server is further operable to produce a plurality of templates for the at least one subclient.

12. The system according to claim 11, wherein mapping at least a subset of the set of data fields to the at least one subclient comprises mapping the subset of data fields to specified data in the plurality of templates.

13. The system according to claim 11, wherein the data processing server is further operable to compare the at least one electronic image for the at least one subclient to each of the plurality of templates in order to identify a matching template for each electronic image of the at least one electronic image.

14. The system according to claim 10, wherein the data processing server is further operable to activate the at least one subclient for participation in data extraction.

15. The system according to claim 14, wherein the data processing server is further operable to disable the at least one subclient from participation in data extraction.

16. The system according to claim 10, wherein the data processing server is further operable to generate at least one report evaluative of the data extraction and the client computer is operable to display the at least one generated report.

17. The system according to claim 10, further comprising a client computer operable to provide a user interface, the user interface displaying, in a first portion, one of the at least one electronic image and, in a second portion, a field table containing fields and data corresponding to the fields extracted from the one of the at least one electronic image.

18. The system according to claim 10, wherein the data is extracted using optical character recognition (OCR) technology.

19. Logic for extracting and organizing data from an electronic image, the logic encoded in non-transitory computer-readable media and operable when executed to:
process a set of data fields representative of data to be extracted;
map at least a subset of the set of data fields to at least one subclient;
attach a rule from the set of rules to at least one of the mapped data fields, wherein each rule in the set of rules represents a transformation from a first data format to a preferred data format;
extract data from at least one electronic image for the at least one subclient into the plurality of mapped data fields using the attached rule; and
store the extracted data.

20. The logic according to claim 19, further comprising logic operable, when executed, to produce a plurality of templates for the at least one subclient.

21. The logic according to claim 20, wherein the logic operable to map at least a subset of the set of data fields to the at least one subclient comprises logic operable, when executed, to map the subset of data fields to specified data in the plurality of templates.

22. The logic according to claim 20, further comprising logic operable, when executed, to compare the at least one electronic image for the at least one subclient to each of the plurality of templates in order to identify a matching template for each electronic image.

23. The logic according to claim 19, further comprising logic operable, when executed, to activate the at least one subclient for participation in data extraction.

24. The logic according to claim 23, further comprising logic operable, when executed, to disable the at least subclient from participation in data extraction.

25. The logic according to claim 19, further comprising logic operable, when executed, to generate at least one report evaluative of the data extraction.

26. The logic according to claim 19, further comprising logic operable, when executed, to display one of the at least one electronic image and data extracted from the one of the at least one electronic image in a single user interface.

27. The logic according to claim 19, wherein the logic operable to extract data uses optical character recognition (OCR) technology.

* * * * *